Figure 1:
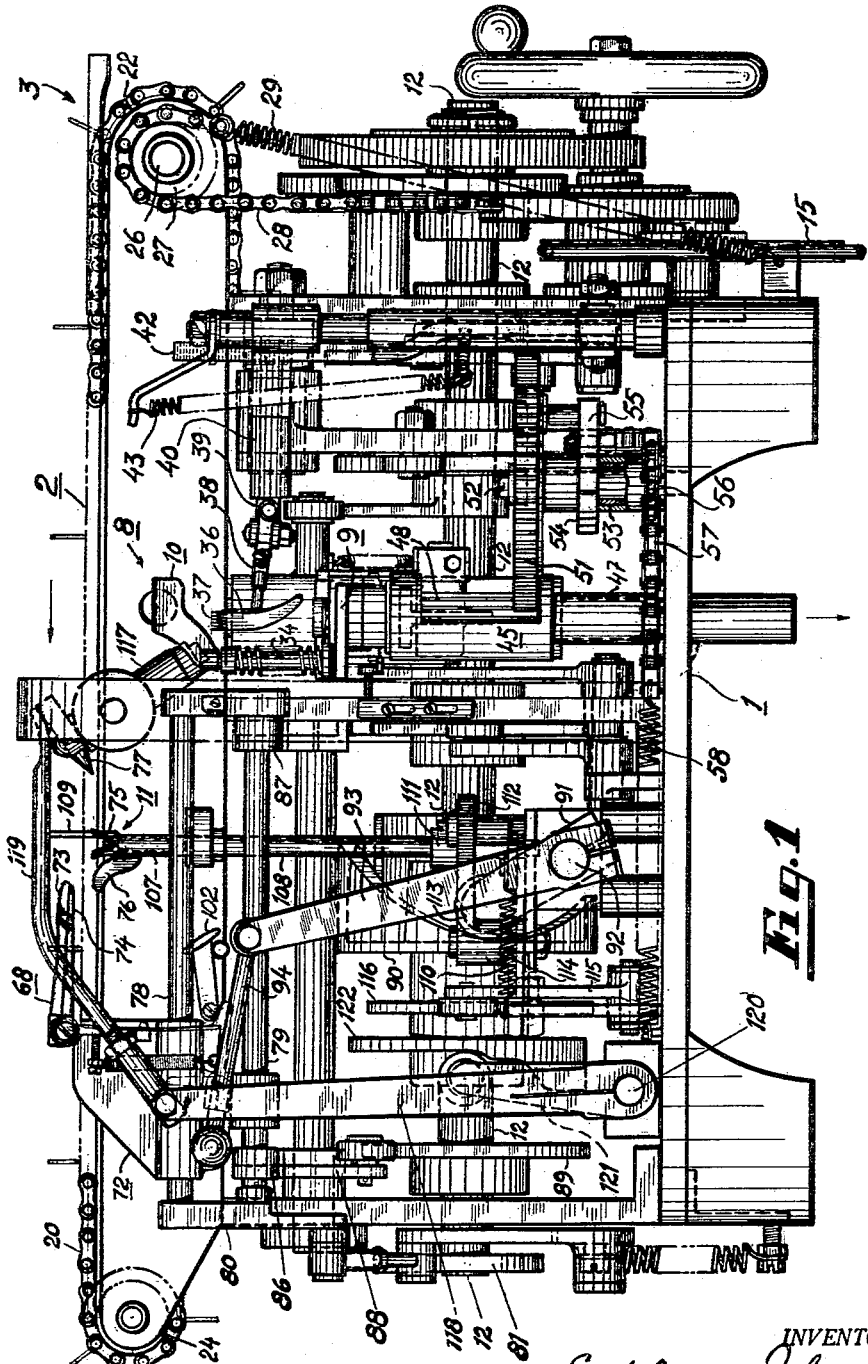

June 11, 1963 E. R. JOHANSSON 3,092,952
MACHINE FOR FORMING SECURING LOOPS ON SANITARY NAPKINS
Filed Nov. 10, 1960 13 Sheets-Sheet 3

INVENTOR.
Erik Ragnar Johansson
BY Pierce, Scheffler & Parker
his Attorneys

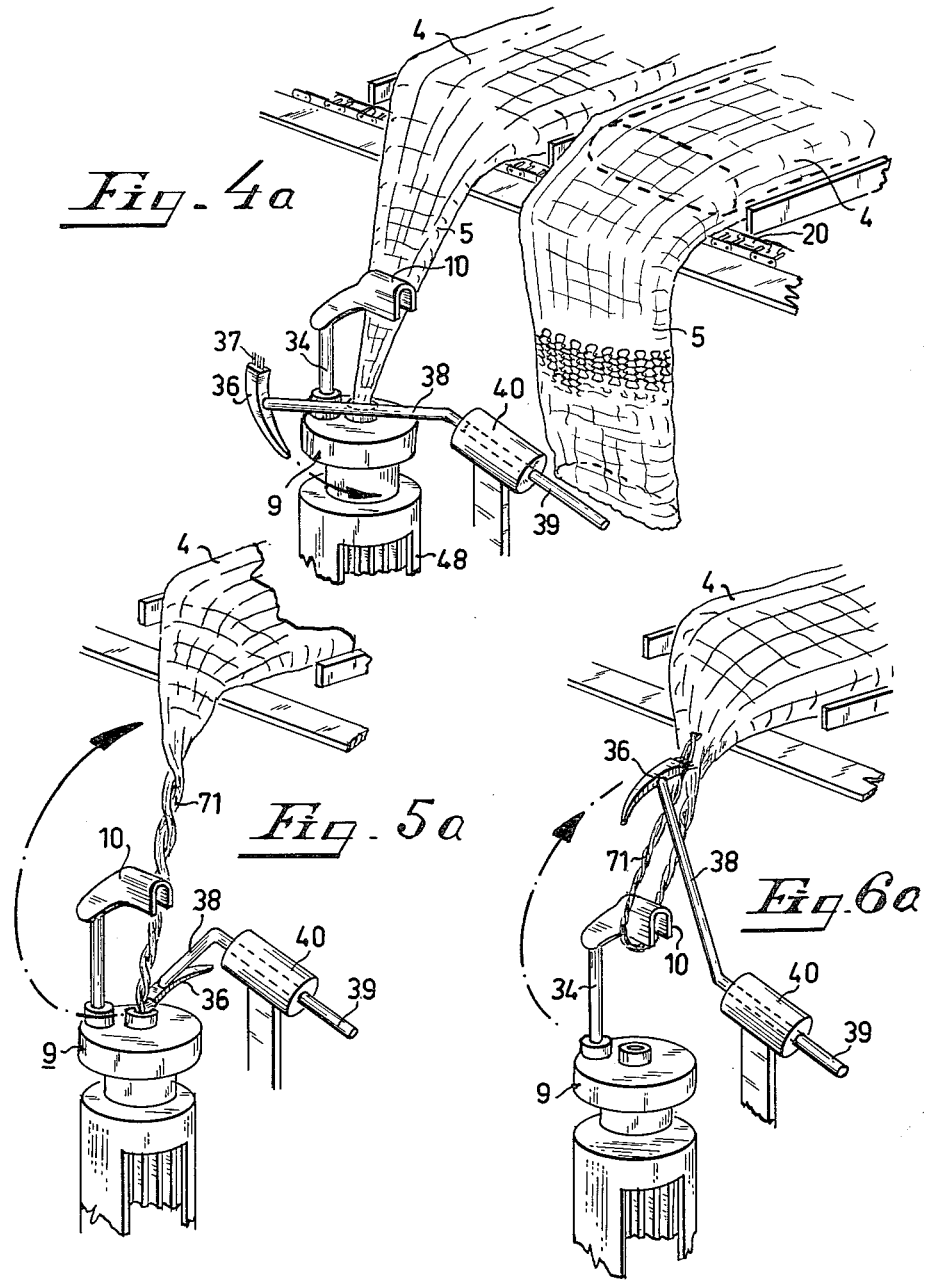

June 11, 1963  E. R. JOHANSSON  3,092,952
MACHINE FOR FORMING SECURING LOOPS ON SANITARY NAPKINS
Filed Nov. 10, 1960  13 Sheets-Sheet 6
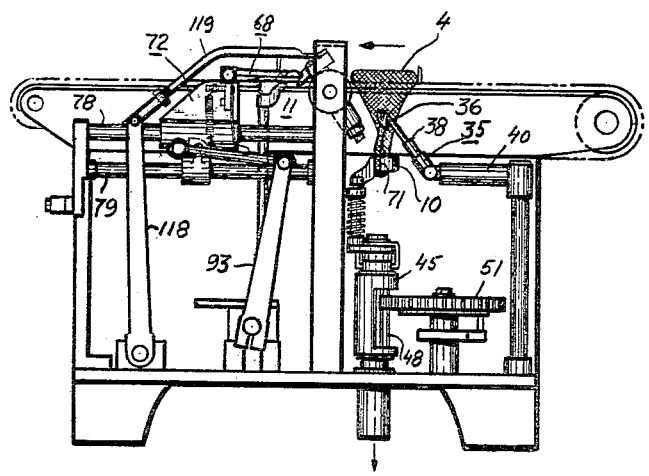
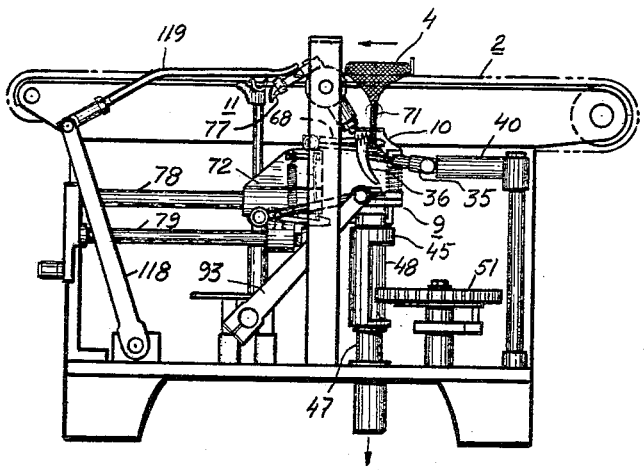
INVENTOR.
Erik Ragnar Johansson.
BY Price, Scheffler & Parker
his Attorneys June 11, 1963  E. R. JOHANSSON  3,092,952
MACHINE FOR FORMING SECURING LOOPS ON SANITARY NAPKINS
Filed Nov. 10, 1960  13 Sheets-Sheet 7

INVENTOR.
Erik Ragnar Johansson
BY
Pierce, Scheffler & Parker
his Attorneys

June 11, 1963  E. R. JOHANSSON  3,092,952
MACHINE FOR FORMING SECURING LOOPS ON SANITARY NAPKINS
Filed Nov. 10, 1960  13 Sheets-Sheet 8

INVENTOR.
Erik Ragnar Johansson
BY Pierce, Scheffler & Parker
his Attorneys

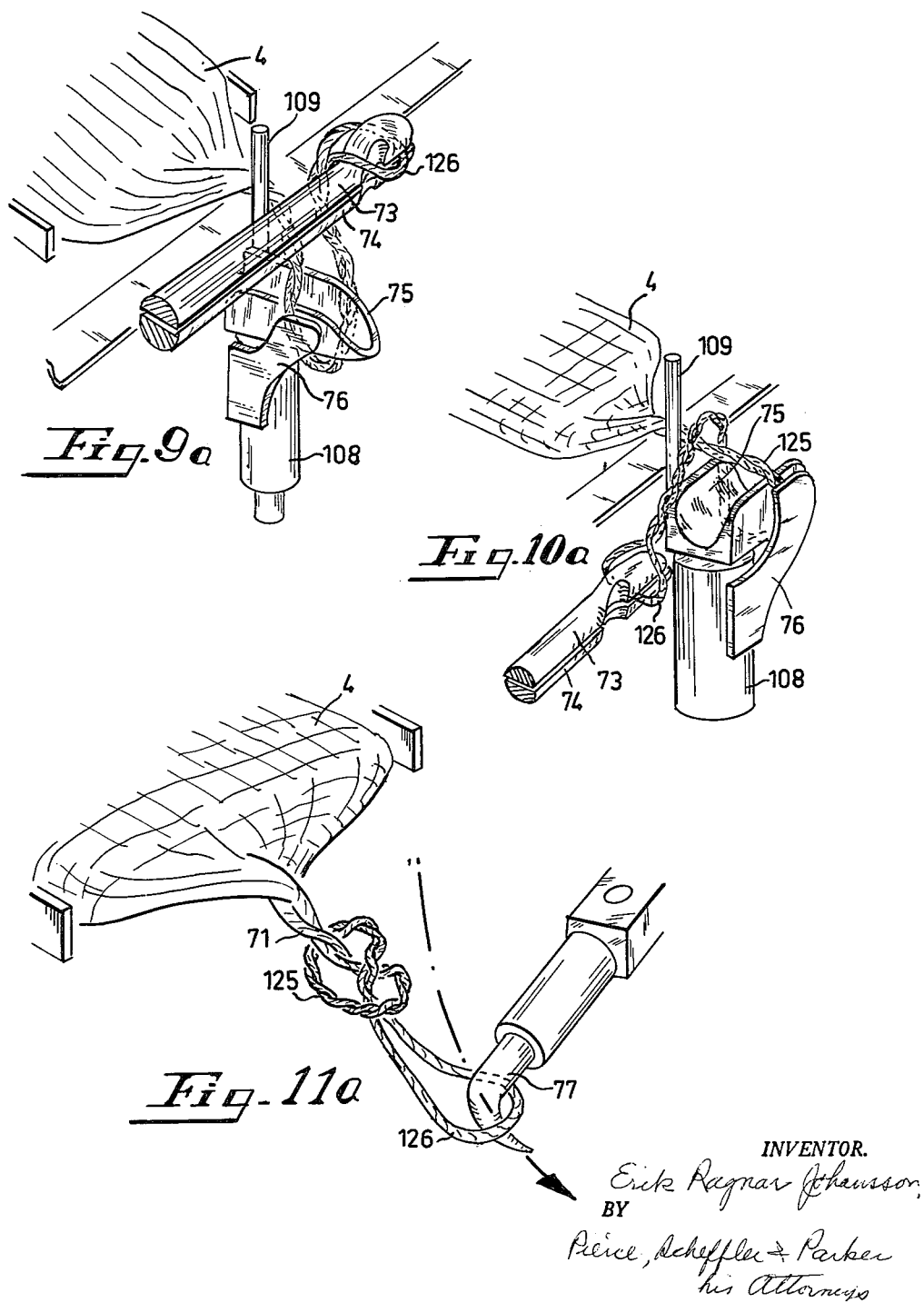

June 11, 1963  E. R. JOHANSSON  3,092,952
MACHINE FOR FORMING SECURING LOOPS ON SANITARY NAPKINS
Filed Nov. 10, 1960  13 Sheets-Sheet 10

INVENTOR.
Erik Ragnar Johansson,
BY Pierce, Scheffler & Parker
his Attorneys

June 11, 1963  E. R. JOHANSSON  3,092,952
MACHINE FOR FORMING SECURING LOOPS ON SANITARY NAPKINS
Filed Nov. 10, 1960  13 Sheets-Sheet 11
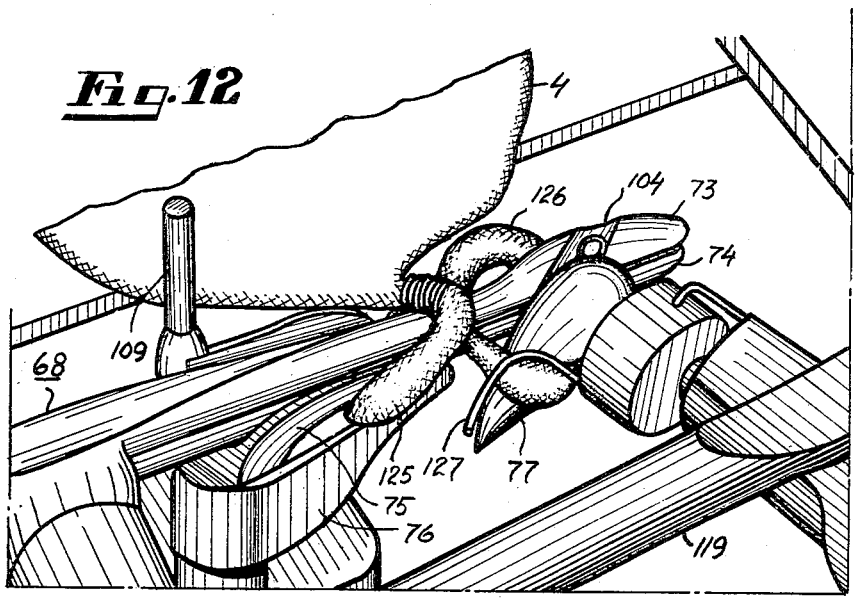
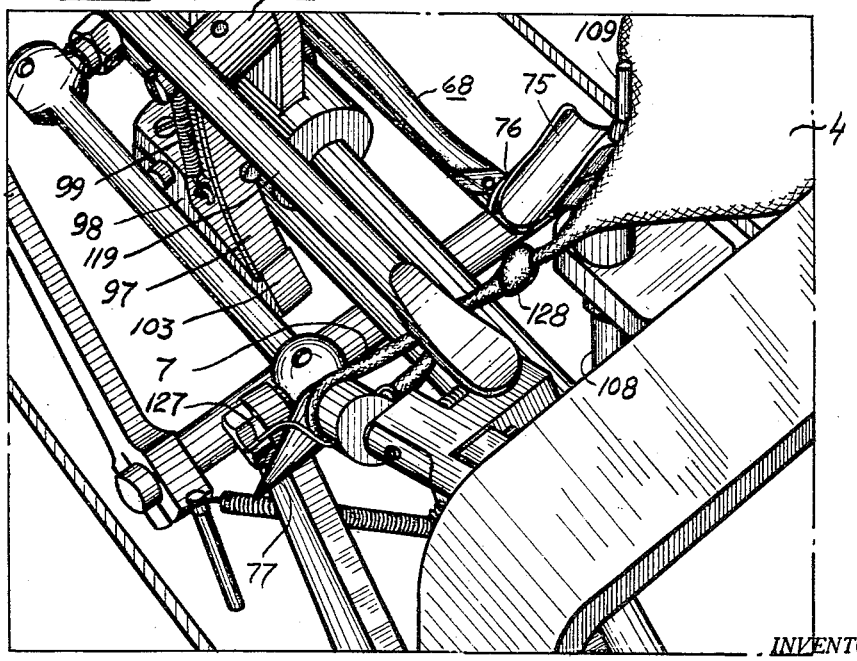
INVENTOR.
BY Erik Ragnar Johansson
Pierce, Scheffler & Parker
his attorneys June 11, 1963 E. R. JOHANSSON 3,092,952
MACHINE FOR FORMING SECURING LOOPS ON SANITARY NAPKINS
Filed Nov. 10, 1960 13 Sheets-Sheet 12
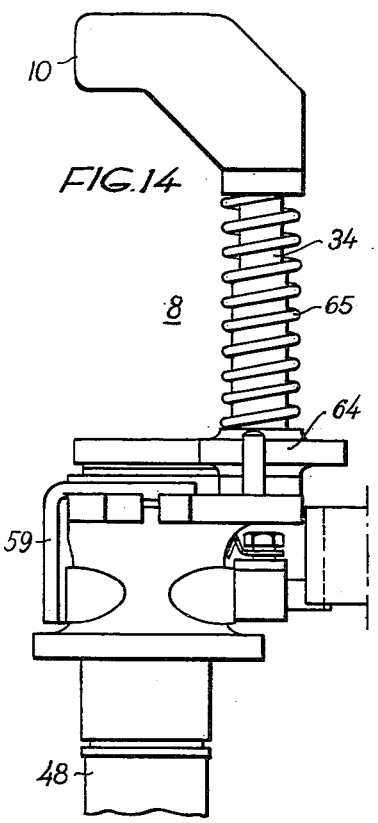
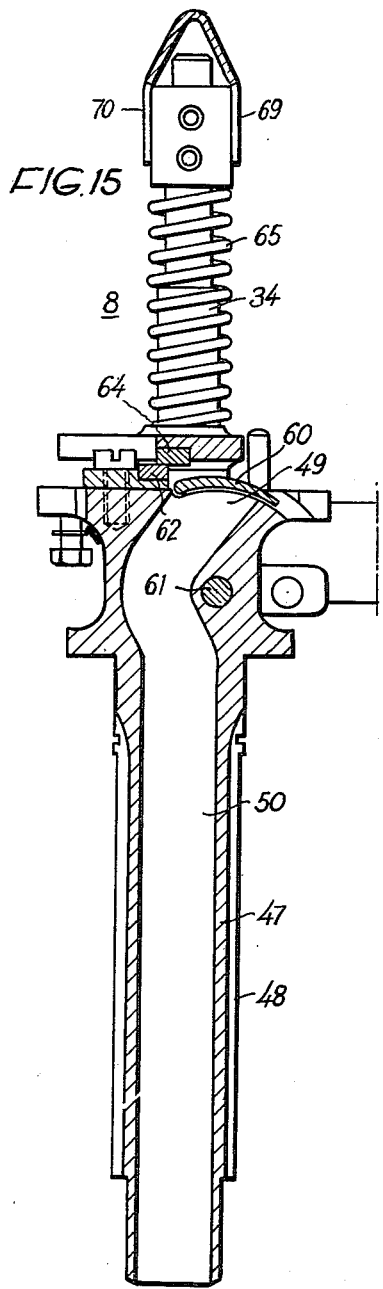
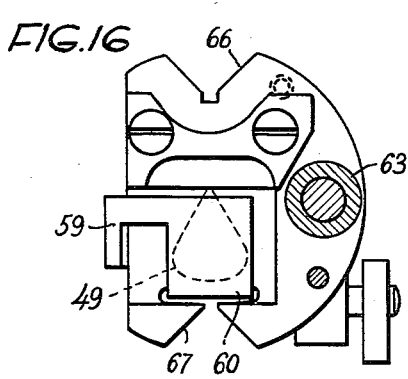
INVENTOR.
BY Erik Ragnar Johansson,
Pierce, Scheffler & Parker
his Attorneys June 11, 1963  E. R. JOHANSSON  3,092,952
MACHINE FOR FORMING SECURING LOOPS ON SANITARY NAPKINS
Filed Nov. 10, 1960  13 Sheets-Sheet 13
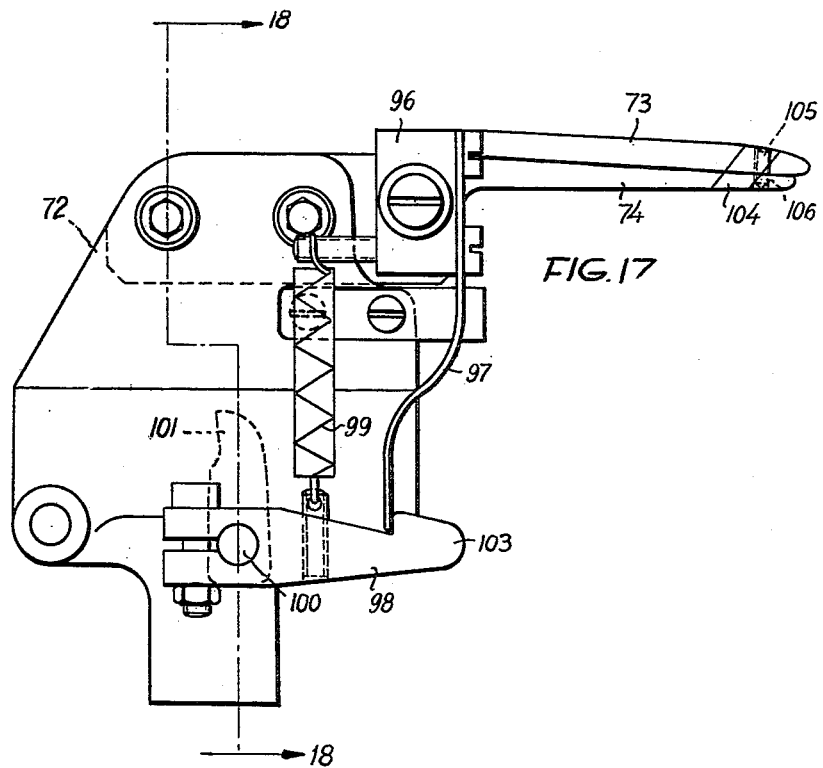
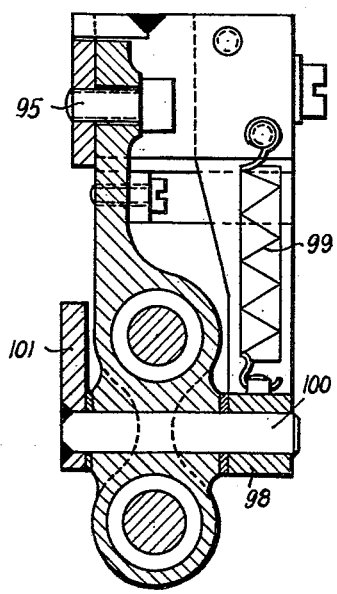
INVENTOR.
Erik Ragnar Johansson,
BY Pierce, Scheffler & Parker
his Attorneys

United States Patent Office 3,092,952
Patented June 11, 1963

---

3,092,952
MACHINE FOR FORMING SECURING LOOPS ON SANITARY NAPKINS
Erik Ragnar Johansson, Molndal, Sweden, assignor to Molnlycke Vafveri Aktiebolag, Goteborg, Sweden, a corporation of Sweden
Filed Nov. 10, 1960, Ser. No. 68,387
Claims priority, application Sweden Nov. 24, 1959
3 Claims. (Cl. 57—34)

This invention relates to a machine for forming securing loops on sanitary napkin having a tubular covering which extends outside the absorption insert and forms two tubular parts bendable double.

Hitherto such loops have been formed by hand: this is laborious, slow and expensive.

The machine according to this invention comprises a support for the napkin such that at least one of the tubular parts hangs downwardly at one side of the support, a guide member situated on at least one side of and below the support, bending means adapted to move the tubular parts hang downwardly at each side of and means for tying a knot on said doubly bent part.

The support is preferably in the form of a stepwise movable feed track which stops at the guide member and securing means to enable the respective bending and securing operations to be effected.

If the tubular part hangs down at only one side of the support, it must be passed twice through the machine. In order to avoid this, the support is preferably such that the tubular parts hang downwardly at each side of and below the support. In this case a guide member, bending means and securing means are located at each side of the machine.

The machine advantageously includes a suction device for each guide member, and the suction device is adapted to catch the downwardly hanging tubular part to locate it for engagement by the bending means.

Preferably the machine includes means for twisting the bent part of the tubular part and the downwardly hanging part of the tubular part together to form a loop.

Figure 2:
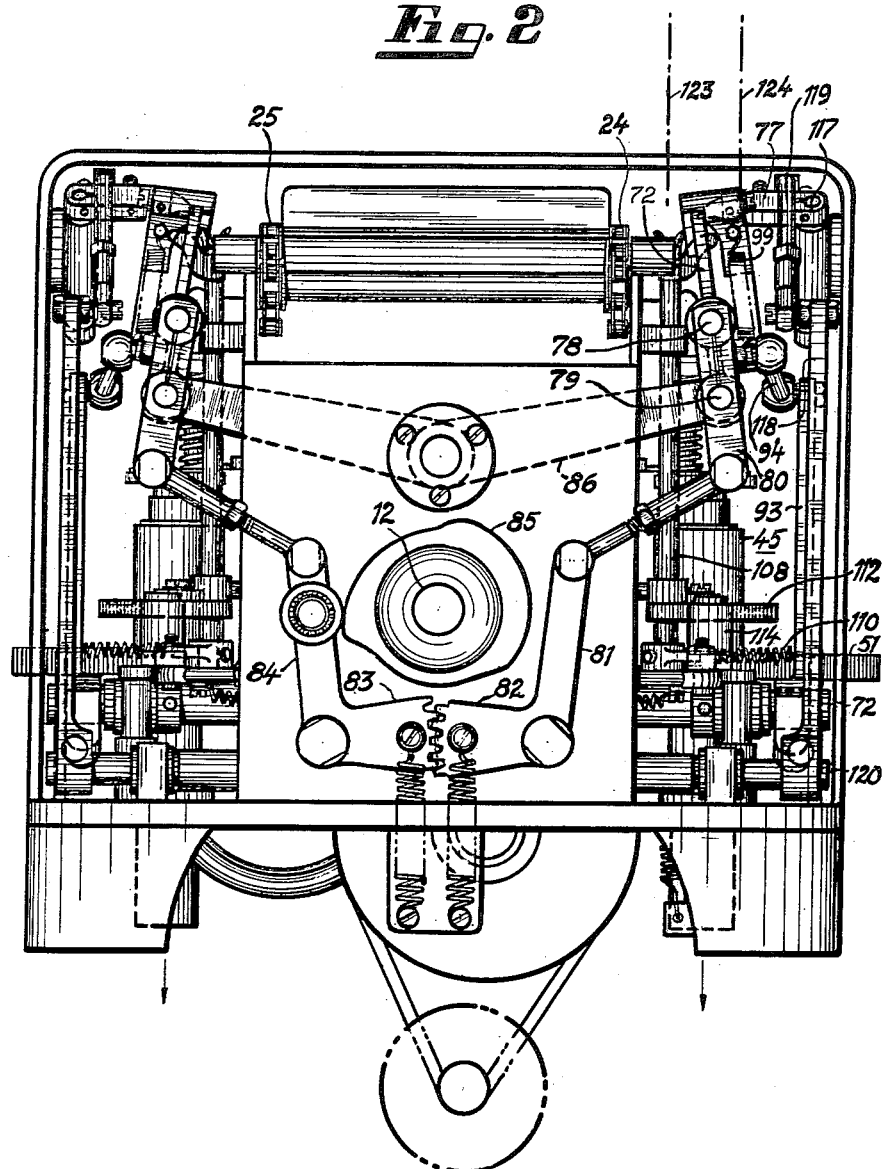
Figure 3:
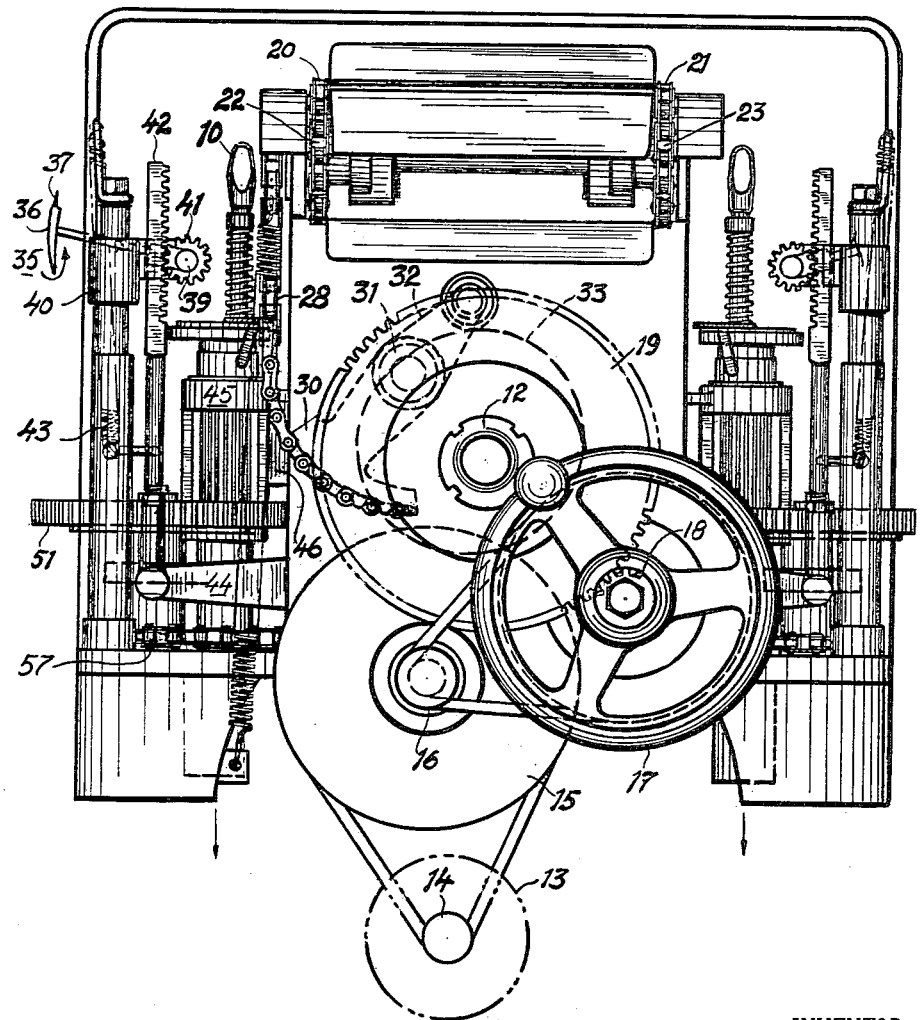
Figure 4:
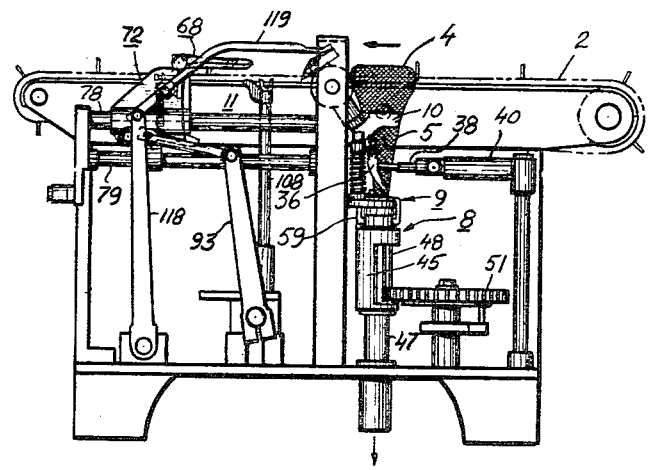

The scope of the invention is defined by the accompanying drawings; and how it may be performed is hereinafter particularly described with reference to the accompanying drawings in which:

FIGURE 1 is an elevation of the machine;
FIGURE 2 shows the feed outlet end of the machine;
FIGURE 3 is a view of the machine's feed inlet end;
FIGURE 4 is a diagrammatic elevation of the machine;
FIGURE 4a is a diagrammatic perspective view showing the initial stage of forming a loop;
FIGURES 5, 5a, 6, 6a, 7 and 7a show different stages in the formation of a doubly bent and twisted tubular part;
FIGURES 8, 8a, 9, 9a, 10, 10a, 11 and 11a show different stages during the tying of the knot in doubly bent tubular part;
FIGURES 12 and 13 are enlarged perspective views of part of the machine;
FIGURE 14 is an elevation of part of the machine;
FIGURE 15 is a longitudinal section through the part shown in FIGURE 14;
FIGURE 16 is a detail plan view of the part shown in FIGURE 14;
FIGURE 17 is a detail view of the part of the securing means; and
FIGURE 18 is a section on the line 18—18 in FIGURE 17.

A support in the form of an endless feed track 2 is mounted in the frame 1 of the machine, and extends along the upper side of the machine from a feed end 3, where napkins 4 with free downwardly hanging tubular parts 5 (FIGURES 4 and 4a) are successively delivered to the feed track, to a feed outlet end 6, where the machine discharges napkins with tied securing loops 7 (FIG. 13) at both ends of the towel. The feed track is moved stepwise, and pauses between each forward movement to enable the two downwardly hanging tubular parts of the napkin, which happens to be at the suction device 9 of an assembly 8, to be bent double around a guide member 10 of the assembly, at the same time as the napkin, which is at the securing means 11 (FIG. 1) has its doubly bent tubular parts tied for formation of securing loops. As shown in FIGURES 2 and 3 the machine is on the whole symmetrically constructed so as to bend and tie the tubular parts of the napkins at each side of the feed track. Only the left hand side of the machine, seen in the feed direction, is described below.

In connection with the description of the operation of the machine, the directions of movement are given in the following manner. By "forward" is meant a movement which is substantially parallel with the feed movement of the feed track and in the same direction. By "upwards" is meant a movement substantially vertically upwards. By "outwardly" is meant a sideways movement substantially perpendicular from the longitudinal direction of the machine. Opposite directions are called "backwards," "downwards," and "inwards."

As can be seen from the drawings, the parts of the machine can be divided into two main groups, namely one group which is adapted to bend double the tubular parts of the napkin to form a primary loop, and a group which is adapted to tie the knot on the doubly bent tubular part to form the final or secondary securing loop.

The stepwise feeding of the feed track and the drive of the movable parts of both the main parts of the machine are in the chosen example synchronized by means of cams, mounted on a cam shaft 12 which rotates at a constant speed.

The motor 13 of the machine drives the cam shaft 12 through a gear arrangement, which consists of wheels 14, 15, 16, 17, 18 and 19. The latter two wheels are gear wheels, the wheel 19 being fixed to the cam shaft. The wheel 17 has a handle to enable the machine to be driven by hand for checking the operation of parts of the machine, the drive motor 13 being then disconnected.

The feed track 2 consists of two endless chains 20, 21, which pass over sprockets 22, 23 and 24, 25 at the feed inlet and feed output ends of the machine. On the shaft 26 of the sprockets at the feed inlet end there is a driven sprocket 27, which is connectible with the shaft by means of a one-way clutch (not shown). The drive chain 28 which passes around this wheel 27 is held by a spring 29, and is held down and around a toothed segment 30, which forms one end of a lever 32 rockable about a fixed shaft 31, and the other end of the lever 32 is actuable by a cam 33 (FIGURE 3) secured to the cam shaft 12. Owing to the shape of the cam 33, the lever 32 oscillates to-and-fro, and this when it pulls the chain 28 downwardly causes a forward step movement of the feed track. The napkin, which with the free tubular parts 5 hanging downwardly on each side of the feed track is placed on the track at its feed inlet end, is fed forwardly two stages to a position above the suction device 9, where these tubular parts are caught by the suction devices on each side of the transport track. This initial position for the bending double of the left hand tubular part is shown in FIGURE 4 and FIG. 4a.

Before the various operations for bending double and twisting are described in greater detail, the various parts which perform these operations will be described. The guide member 10, around which the tubular part is to be bent double, consists of a horizontal arm, which is carried by an upright 34 fixed to the suction device of the assembly. The assembly is rotatable to effect twisting and is raisable and lowerable, inter alia for stretching of the tubular part and for controlling the tension on it during twisting. In addition, in the embodiment shown, a bending means, which is arranged to engage the tubular part in the neighborhood of the suction device and to move this end of the tubular part in an arc around the guide member when the tubular part is being bent double, is in the form of a crank arm having at its free end a fork 35.

Figure 5:
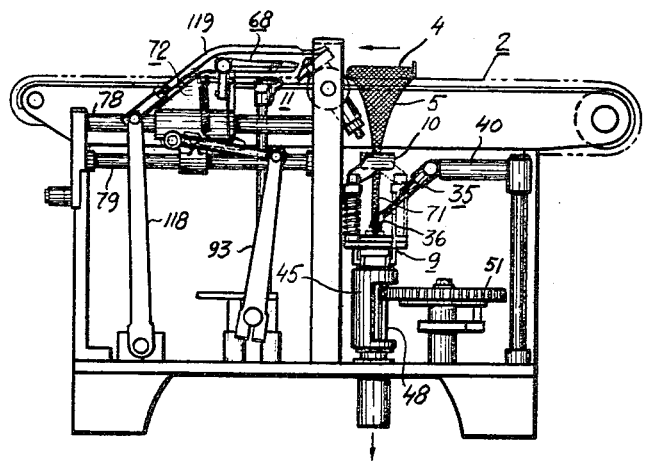

In FIGURE 1 the fork 35 is in an intermediate position, in FIGURE 5 in a lower end position and in FIGURE 6 in an upper end position. Referring to FIGURES 1 and 3 the fork is constructed and driven in the following manner. The actual fork consists of a part tapering towards one end, which as shown in FIGURE 1 is provided with pin like gripping teeth 37 at its upper end and whose lower end is bent backwardly to form a diversion part 36, whose function is to render possible the inward swinging of the fork past the tubular part held in the suction head to the lower end position of the fork as shown in FIGURE 5. The fork is secured to the outer or free end of a crank arm 38, which is secured to a rotatable shaft 39 and forms wtih the latter a certain angle as shown in FIGURE 6. The rotatable shaft is journalled in a holder 40, which in the chosen embodiment is fixed, but which can also be outwardly swingable in a sidewards direction to leave more room for the downwardly hanging tubular part, when the napkin is fed forwardly to its position above the suction device. At the rear end of the rotatable shaft a gear wheel 41 (FIG. 3) is fixed, and the wheel is rotated by means of a vertically movable rack 42. This is biased upwardly by a tension spring 43. The lower end of the rack is connected to a lever 44 (FIGURE 3), which rocks upwardly and downwardly under the influence of a cam (not shown) fixed to the cam shaft 12. The horizontal rotatable shaft 39 is preferably so arranged that it is directed towards a vertical line through the centre of the suction device.

The assembly 8, whose construction is shown in detail in FIGURES 14, 15 and 16, is rotatably journalled in a sleeve holder 45, which is fixed to the outer end of an arm 46 (FIGURE 3), which extends inwardly from the holder and is at its inner end journalled so that it is vertically movable in a guide (not shown) on the machine frame. This arm and consequently the holder 45 is adjustable in various vertical positions between an upper and a lower end position for the assembly since the arm 46 is actuated through a linkage (not shown) by a cam (not shown) on the cam shaft 12. The assembly (FIGURES 14, 15) includes a sleeve 47, which is provided with longitudinally extending teeth 48 and is rotatably journalled in the holder 45. The upper end of the sleeve forms the suction device 9 with a suction opening 49 (FIG. 16), which communicates through the inner space of the sleeve with the lower end of the sleeve, which is adapted to be connected to a vacuum source. The teeth of the sleeve 48 are in engagement with a gear wheel 51 (FIGURE 1), which is rotatably journalled on a rigid shaft 52. When the sleeve 47 is moved up and down the holder 45, the teeth 48 are always in engagement with the tooth wheel 51. Beneath this gear wheel a sleeve 53 is rotatably journalled on the shaft 52, and the sleeve is by means of a latch tooth wheel 54 on the sleeve 53 and a one-way catch 55 on the gear wheel 51 connectible with the gear wheel 51. A sprocket 56 is also secured to this sleeve, and is driven by a chain 57. One end of the chain is connected with the frame of the machine by a spring 58. To the rear of the chain wheel 56 the chain 57 passes over a guide wheel (not shown) and its other end is secured to a segment. The segment in its turn is pivotally mounted on a rigid shaft and is arranged to be actuated by a cam secured to the cam shaft 12. The shape of this cam is such that the segment is given an oscillatory swinging movement, which is transferred by a chain 57, sprocket 56, sleeve 53 and one way clutch 54, 55 to the gear wheel 51, which is thereby fed forwardly a certain extent to rotate the assembly the desired number of revolutions.

As shown in FIGURE 16 the suction opening 49 at the upper end of the sleeve is V-shaped. A securing bracket 59 is rotatably journalled on the sleeve 47 and is provided with a catch device in the form of a bucket-like screen 60, whose front edge is adapted in the position shown in FIGURE 16 to clamp the edge of the tubular part against the edge of the suction opening, the screen of the bracket covering the suction opening. When the tubular part is to be drawn into the suction opening, the bracket 59 is swung backwardly to expose the suction opening. For this purpose the shaft can be provided with a radially extending arm, which during the vertical movement of the upper part of the assembly cooperates with a fixed abutment on the machine frame in such a way that the bracket is thereby moved into its open position. The details of this mechanism are not shown in the drawings.

At the upper side of the suction device there is a cutter, which comprises a fixed cutter member 62 and a knife 64 swingably mounted in the upright 34 and biased by a spring 65 towards its open position. This knife can be actuated by means of a horizontal abutment arm (not shown), which lies on the inner side of the assembly and is so mounted that it is movable towards the suction device. At its outer end this arm supports an impact roller which is adapted to strike the back of the knife 64 to swing the knife towards the fixed cutter member 62. The free end of the arm has preferably also a centering wedge, which cooperates with one of the V-shaped openings 66, 64 in the edge of the suction device. These openings are shown in FIGURE 16. The impact arm with the roller and centering wedge is by means of a linkage controlled by a cam shaft; the cam is so shaped and arranged that the arm is moved forwardly when the suction device is in a certain vertical position, namely when the tubular part is to be cut off at its held end and the centering opening 67 is directed towards the impact arm and when the tubular part, which is bent doubly around the arm, has been twisted and is to be gripped by a gripper 68 (FIG. 7) for movement to the securing means 11; the suction device is then turned half a revolution so that the centering opening 66 is directed towards the impact arm.

The upright 34, which supports the arm 10 for the bending double, is secured to the suction device at the side of the suction opening 49 as is shown in FIGURES 14, 15 and 16. The arm 10 consists of a V-shaped bent plate, whose sides 69, 70 are downwardly directed (FIGURE 15) and at one end of the arm are secured to the upright. The free end of the arm forms a substantially tangential part, which is situated immediately above the suction opening as shown in FIGURE 14. It is around this part that the tubular part is bent double.

In connection with the upward swinging of the tubular part around the arm to the position shown in FIGURE 6, a retainer arm (not shown), which is rotatably mounted in the frame of the machine, is controlled by a cam on the cam shaft so that the retainer arm with its free end presses the end of the tubular part towards the untwisted upper part of the tubular part in FIGURE 6 to enable the fork 35 to be withdrawn from the position shown in FIGURE 6. This retainer arm is however not absolutely necessary and has therefore not been shown in the drawings.

When a napkin is fed forwardly to the position above the assembly 8, the latter is in its upper end position with the arm 10 for bending the napkin double directed backwardly; the fork 35 is then set in its intermediate position as shown in FIGURE 1. The knife 64 of the suction device and the securing bracket 59 of the catch are moved backwardly towards their open position, so that the freely downwardly hanging tubular part is drawn into the suction opening 49. This starting position for the tubular part, assembly and bending means is shown diagrammatically in FIGURE 4 and FIG. 4a. From the feed track 2 the tubular part 5 extends substantially vertically downwardly to the suction opening 49 of the suction device 9, and is then on the inside of the bending arm 10.

The next step is that the assembly 8 is lowered to an intermediate position (not shown), where only a small or end part of the end 5 of the tubular part is still within the suction opening 49. In this intermediate position the securing bracket (that is the catch) of the suction device has been moved clear from the fixed abutment, which had previously held the bracket in the open position, the securing bracket being then brought into contact with the tubular part by a spring for clamping it firmly. Simultaneously the assembly begins to rotate to the right seen from above.

From the intermediate position the assembly is lowered to its lower end position, and during this lowering the assembly is rotated a certain number of revolutions, in the illustrated example two revolutions. The tubular part held by the securing bracket being thus twisted two turns, that is the primary twisting, and stretched. This rotation is indicated in FIGURE 5 by the arm 10 and assembly upright being also shown in a chain line position. During this rotation of the assembly the arm 10 for bending the tubular part double rotates around the centrally located tubular part 5 without being hindered by it. When the assembly has reached its lower end position and the rotation of the assembly has ceased, the fork 35 is swung downwardly to its lower end position, the diversion part 36 of the fork 35 engages the twisted tubular part 41 and moves it a short distance, so that the fork can move to its position on the inside of the tubular part 71 as shown in FIGURE 5, and FIG. 5a, after which the tubular part springs back and takes up the position shown in FIGURE 5 in the path of the fork. Immediately afterwards the fork is swung back towards the tubular part and engages it with the teeth 37, and at the same time the knife of the suction device is actuated so that the tubular part 71 is cut off beneath the fork. After the cutting, the fork 35 is swung upwardly while the tubular part 71 is bent towards the bending arm 10. At the same time the assembly is raised somewhat to avoid too much tension in the tubular part 71 while the tubular part is being bent double round the arm 10. By the time the tubular part has been bent double, the fork has been swung upwardly to its upper end position, where the fork holds the end of the tubular part pressed against the untwisted part of the tubular part as shown in FIGURE 6 and FIG. 6a. During this time the assembly has been lifted to a first intermediate position during its upward movement.

Figure 7A:
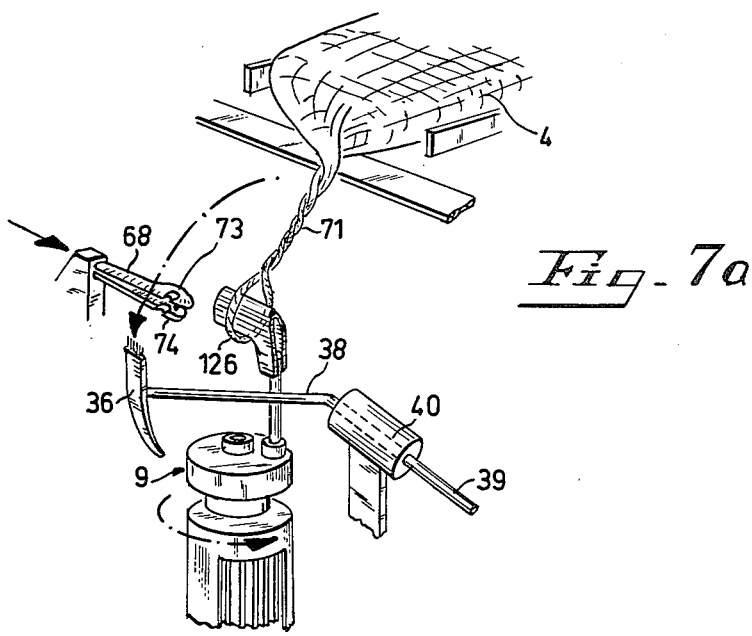

In this first intermediate position the assembly is rotated a certain number of revolutions, in the illustrated example three revolutions, for twisting together the tubular part which has been doubled. If desired the above mentioned retainer arm can be brought into contact with the end of the tubular part at the fork before this rotation of the assembly. The retainer arm takes over from the fork the holding of the end of the tubular part, thereby enabling the fork to be swung back to its intermediate position. By twisting of the tubular parts their ends are however normally sufficiently fixed, and for this reason the retainer arm can usually be dispensed with. In the shown example the assembly is rotated a further one and a half rotations during simultaneous raising of the assembly to another intermediate position, which is shown in FIGURE 7 and FIG. 7a. During this additional rotation of the assembly, the fork is swung and thereafter the retainer arm, if fitted, is moved away from the tubular part, the fork then being moved to its intermediate position shown in FIGURE 7 and FIG. 7a. During the additional rotation, the tubular parts are twisted more and the end of the tubular part is caught in the part of the tubular part, which in FIGURE 6 and FIG. 6a is untwisted, but which in FIGURE 7 and FIG. 7a has been twisted upwardly towards the neighbourhood of the feed track: this forms a loop. The twisting of the doubly bent tubular part during the raising and rotation of the assembly is called the secondary twisting of the tubular part.

In the second intermediate position during the upward movement of the assembly the arm 10 for bending double the tubular part has been rotated to a forwardly directed position as shown in FIGURE 7 to receive the gripper 68. The assembly is preferably then raised slightly, so that the grip of the twisted loop on the arm 10 is somewhat loosened so that the gripper can more easily draw the loop off the arm. In FIGURE 7 the gripper has been moved in between the sides 69, 70 of the U-shaped arm, and its jaws grip the part of the loop, which extends between the undersides of the sides of the arm. The manner in which the gripper is moved into this position is apparent from the following description of the securing means. As soon as the gripper has released the loop from the arm 10, the assembly is raised into its upper end position and is turned a half turn to the starting position shown in FIGURES 1 and 4.

The other main group of the machine, which is designed for tying of the doubly bent and twisted tubular part 71, comprises the gripper device 68 with holder 72 and parts mounted on the latter and adapted to control the jaws 73, 74 of the gripper device, the securing means 11 having a horizontal tying arm 75, a retainer arm 76 which cooperates with the arm 75 and a tightening hook 77. These parts and their drive are described in detail below individually, and is followed by a description of the various operations during the tying.

As shown in FIGURES 1, 2, 17 and 18 the holder of the gripper device is movable on an upper and a lower shaft 78 and 79 respectively. These shafts at their ends are connected with each other; the front connection comprises an arm 80 (FIGURE 2) which extends downwardly and at its lower end is by means of a link connected with an angle arm 81; the angle arm is by means of a toothed segment 82 in engagement with another toothed segment 83 which is connected to a corresponding angle arm 84 for controlling the gripper holder from the other side of the machine. The two angle arms 81, 84 are actuated by a cam 85 on the cam shaft 12 of the machine for effecting the to-and-fro oscillatory movements.

The lower shaft 79 is journalled in the outer ends of two rocking arms 86, 87, which at their inner ends are rockably mounted in the machine frame. These rockable arms 86, 87 are rigidly connected with each other and are provided with an arm 88, which is actuated by a cam 89 on the cam shaft, so that the rocking arms swing upwardly and downwardly.

The movement of the holder 72 on the shafts 78, 79 is achieved by means of a cam 90 fixed to the cam shaft 12; the arm actuates a crank arm 91 and thereby rotates a shaft 92. The latter supports at its outer end a rockable arm 93, which in its turn is connected by a link 94 with the holder 72 to move the latter forwardly or backwardly.

The holder 72 can thus be swung sidewards by rocking the arm 80 around the lower shaft 79, which is achieved by swinging of the angle arm 81. The holder can further be raised and lowered by swinging the rockable arms 86, 84, and, in addition, the holder can be moved forwards and backwards on the shafts 78, 79 by means of the cam guided arm 93. This means that the gripper device 68 can within certain limits be moved in three dimensions along a path, which is determined by the construction and synchronization of the three cams 85, 89, 90, which control the movements of the holder.

The details of the construction of the holder and gripper device is best seen from FIGURES 17 and 18. The two elongated jaws 73, 74 of the gripper device are swingable relatively to one another around a horizontal shaft 95 (FIGURE 18). The lower jaw is secured to the holder, while the upper jaw is rockably mounted on the shaft 95. The upper jaw has a part 96, on whose rear side is secured a blade spring 97, which extends downwardly and cooperates with a latch 98 rockably mounted at the lower end of the holder. The latch is held in contact with the lower end of the blade spring by a tension spring 99. The shaft 100 of the latch passes, as shown in FIGURE 18, through the holder and out on its inside, where the shaft is provided with an abutment arm 101 adapted to cooperate with a rockable abutment 102 (FIG. 1), which is rocked upwardly when the gripper holder is moved rearwardly, but which acts as a rigid stop, when the holder is moved forwardly past this abutment; the arm 101 of the latch is then actuated and the shaft 100 rotated for releasing the latch 98 so that the upper jaw 73 under the action of the spring 99 is rocked upwardly to an open position limited by a stop. The blade spring 97 is then swung rearwardly a distance no greater than that necessary for the free end of the latch 103 to abut the lower end of the spring when the arm 101 of the latch is released and the latch under the action of the spring 99 is swung upwardly back to its former position. This opening of the gripper device is achieved when the tying of the tubular part at the securing means is completed, whereupon the gripper device is moved down to the next eye around the arm 10 where the gripper device is again closed by the blade spring engaging a fixed abutment on the frame, so that the blade spring is bent forwardly and the latch 98 can assume the latch position shown in FIGURE 17.

At the free ends of the jaws there is an inclined downwardly directed groove on the outside of the jaws. The purpose of this groove is to facilitate the gripping of the eye in the manner described in connection with the description of the tying. In addition a pin 105 is fixed in this groove in the upper jaw. This pin extends downwardly into a hole 106 in the lower jaw and is arranged to form a catch tooth in the gap of the gripper device, when its jaws are open. The pin 105 prevents the loops from being drawn too far in between the jaws, and at least no further than to the inclined groove 104.

The tying arm 75 of the securing means has a channel shaped part, which at its one end is secured to a vertical, rotatable shaft 107. A sleeve 108 is rotatably journalled on this shaft, which at its upper end supports the retainer arm 76. The tying arm 75 and its shaft can be turned from a first end position, where the channel of the tying arm is directed straight out to the side as shown in FIGURE 1, to another end position, in which it is directed rearwardly as shown in FIGURE 10. The retainer arm 76 can on its side assume a free position, in which it is directed forwardly as shown in FIGURE 1, and can be swung from this position into engagement with the front side of the projecting tying arm in FIGURE 9 and FIG. 9a so as to secure the loop around the tying arm; the retainer arm 76 when it continues swinging rearwardly moves with it the tying arm to its other end position, where the retainer arm is also directed rearwardly and still abuts the side of the tying arm as shown in FIGURE 10 and FIGURE 10a. On one side of the typing arm a support pin 109 is secured, and extends above the tying arm and is adapted to prevent the twisted tubular part 71 from sliding off the tying arm as is described below in more detail.

The hook 77 is rockably mounted on an inclined shaft 117 and is controlled by a rockable arm 118, which at its upper end is connected with the hook by means of a link 119 and its lower end is secured to a transverse rotatable shaft 120, which is provided with a crank arm 121, which abuts a cam 122 on the cam shaft 12. In this way the arm 118 is rocked to-and-fro and produces a corresponding swinging of the hook 77 at an inclined angle downwardly towards the gripper device 68 and beyond this at the correct instant, after which the hook is returned to its disengaged position.

The gripper device 68 is directed to the rear and executes a series of parallel movements, which in certain positions can be better described with reference to two vertical reference planes parallel with the feed track, namely an inner and an outer plane 123 and 124 (FIGURE 2); the inner plane 123 passes through the rotatory shaft 104 of the tying arm and the outer plane 124 lies somewhat outside the securing means. When the gripper is said to be in the one or the other reference plane, its longitudinal axis coincides with or lies in the neighbourhood of the reference plane in question.

In FIGURE 7, the gripper device 68 has been moved back to the arm 10 which bends the napkin double, and has gripped the loop of the tubular part 71 around the arm 10. The gripper device is at the inner reference plane 123. The tying arm 75 is directed outwardly and the retainer arm 76 forwardly.

Figure 8A:
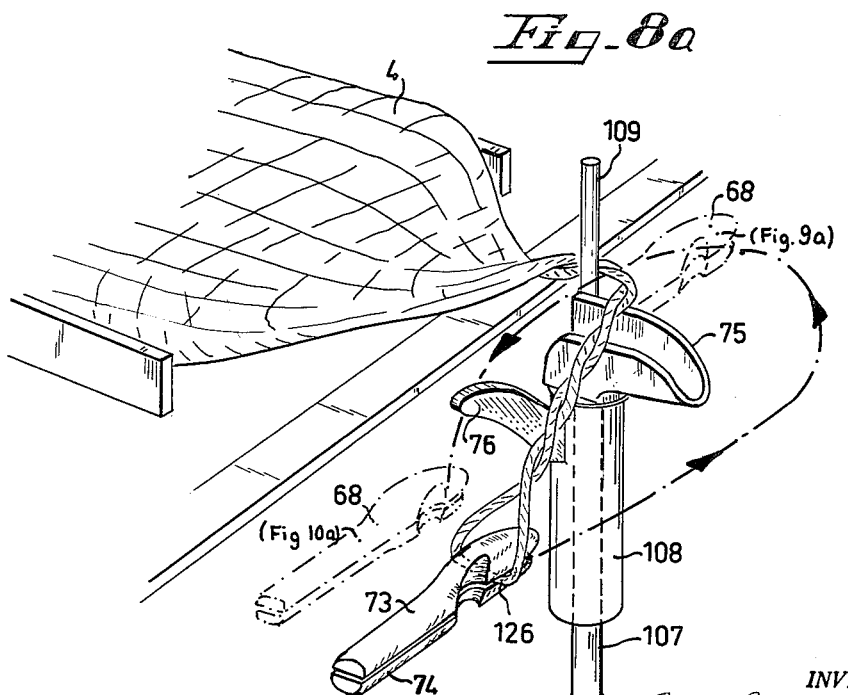
Figure 8:
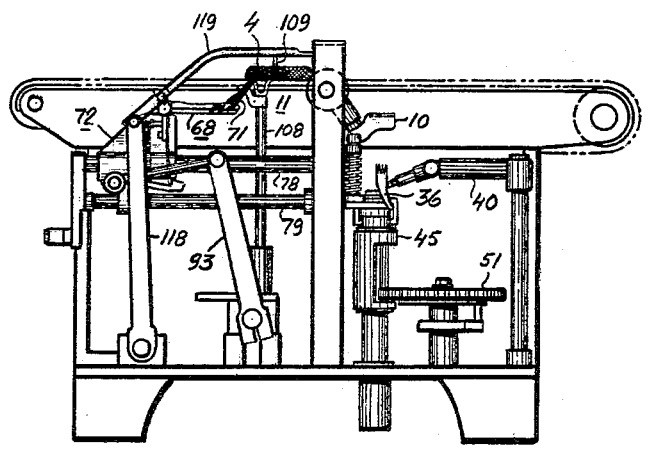

The next operation is that the napkin on the feed track 2 in FIGURE 7 is fed to the position in FIGURE 8 and 8a. At the same time the gripper device is moved in a path which extends upwardly and forwardly at the same time as the gripper device is moved sidewardly out to the outer reference plane 124: here it is raised beyond the outwardly extending tying arm, and the gripper device is then moved back to the inner reference plane and moved forwardly over the tying arm to the position shown in FIGURE 4 and FIG. 9a, where the tubular part held by the gripper device is not however shown. The gripper device is thereafter lowered to the position shown in FIGURE 8 at a lower height than the securing means.

During this movement of the gripper device the twisted tubular part 71 has been placed over the tying arm and is stretched between the gripper device 68 and support pin 109 on the tying arm as shown in FIGURES 8 and 8a, where the gripper device is still on the inner reference plane 123.

Figure 9:
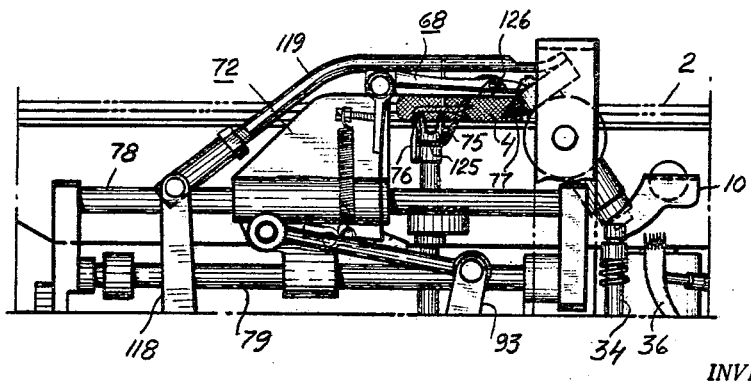
Figure 10:
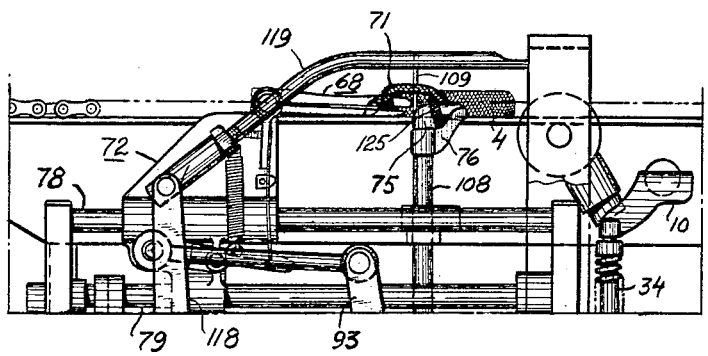

From the position shown in FIGURE 8 the gripper device is movable at an angle rearwardly and out to the outer reference plane 124 at the same time as it is raised to the position shown in FIGURE 9 and 9a, where the gripper device is at a greater height than the tying arm. During this movement the retainer arm 76 is swung to the position shown in FIGURES 9 and 9a, where the latter arm grips the tubular part at the front side of the tying arm. In FIGURE 9 the gripper device has in addition been moved inwardly to the vicinity of the inner reference plane 123 and is thus above the tying arm.

From the position of FIGURES 9 and 9a the gripper device is moved forwardly along the inner reference plane 123, the tubular part 71 being then bent into an eye 125 around the tying arm. When this loop has been formed the retainer arm is swung further backwards and moves the tying arm to the rearwardly directed position shown in FIGURE 10 and FIG. 10a. From these figures it is clear that the twisted tubular part 71 is crossed on the upper side of the tying arm. The gripper is now at the same height as the rearwardly directed tying arm and in the inner reference plane 123, that is immediately in front of the tying arm.

From the position of FIGURE 10 the gripper device is moved rearwardly and through the channel in the rearwardly directed tying arm, that is through the loop 125 around the tying arm; the gripper device is then moved rearwardly through the channel a distance somewhat greater than that shown in FIGURE 12 for tightening the tubular part around the tying arm. The gripper device is then drawn slightly forward to the position shown in FIGURE 12 so that the loop 126 held in the gap of the gripper is somewhat widened to facilitate its engagement with the hook 77. When this has occurred the hook 77 is rocked downwardly to the position shown in FIGURE 12; it is then moved through the groove 104 on the outside of the gripper device and as a result catches the loop 126. The hook as is shown in FIGURE 12 is provided with a securing wire 127, which assists in holding the securing loop on the hook. When the hook moves forwardly again to the position shown in FIGURE 12, the arm 101 of the latch 98 arranged on the holder of the gripper device cooperates with the operative abutment 102 on the machine frame, so that the latch 98 drop down and the upper jaw of the gripper device is as a result swung somewhat upwardly for opening the jaws of the gripper device.

Figure 11:
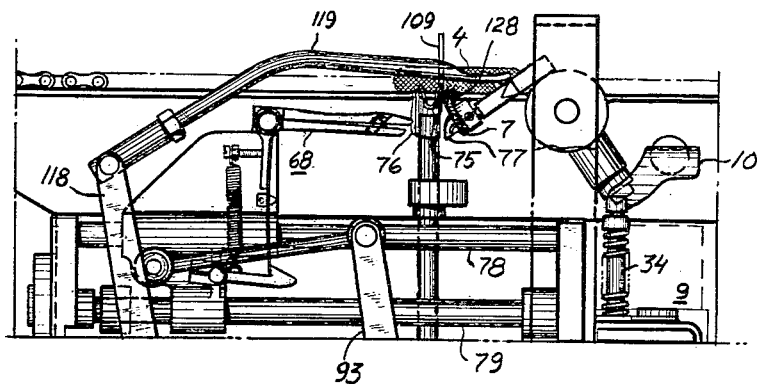

The gripper device is thereafter moved forwardly and lowered to the position shown in FIGURE 11, while the hook 77 is simultaneously swung further downwardly for stretching the tubular part. During this stretching the loop is removed from the tying arm despite the engagement of the retainer arm, and the loop is then tightened while a knot 128 is being formed.

As soon as the loop has been removed from the tying arm, the arm is swung forwardly to its outwardly directed position, while the retainer arm is swung forwardly to its forwardly directed position as shown in FIGURE 1.

As can be seen from FIGURES 11 and 13, in which the knot 128 is in the process of being tightened, the opened gripper device is on its way back to the arm 10, which bends the napkin double, where the secondary twisting of the next doubly bent tubular part is in the course of being completed. When the gripper device reaches the eye around the arm and the jaws of the gripper device have been moved over this loop, the blade spring of the gripper holder engages the fixed abutment (not shown) on the frame and enters the notch in the catch (FIG. 14); the movable jaw of the gripper device then holds the loop against the fixed jaw.

At the same time as the gripper device is moved rearwardly to the arm for bending the napkin double, the hook is rocked back to its rest position, so that the finished securing loop 7 hangs freely down from the napkin, when the feed track is fed forwardly during the next step, that is a new napkin is fed to the suction device and this napkin together with the gripper device is fed forwardly to the securing means.

What I claim is:

1. A machine for forming securing loops at the ends of sanitary napkins having a tubular covering which extends outside the absorption pad and forms at each end a tubular part bendable double, said machine comprising a stepwise movable feed track for said napkins such that at least one of said tubular parts hangs downwardly at one side of said track, an assembly located at said side of and below said track being rotatable and reciprocable along its axis of rotation, said axis being substantially vertical and perpendicular relatively to said feed track, said assembly comprising a guide member mounted on the top thereof, a suction device having a suction opening, a catch device and a cutter arranged above said suction opening, means for raising said assembly into a raised position as said track moves a napkin above it, said suction device being adapted to catch said tubular part, means for lowering said assembly to a position where said tubular part is still within said suction opening, means for moving said catch device into engagement with said tubular part adjacent said suction opening, means for rotating said assembly to twist said tubular part, and means for operating said cutter to cut off said tubular part adjacent said suction device, bending means movable into engagement with said tubular part as said cutter cuts the end of said tubular part to bend it double around said guide member to form a loop, said assembly being rotated to twist said loop, and means for tying a knot in the loop, said knot tying means comprising a gripper device movable to grip said loop, a channel shaped tying arm movable between first and second positions in which the channel of said arm is respectively perpendicular and parallel to said track, said gripper device being operative when the tying arm is in its first position to wind the twisted portion of said loop around the tying arm to form an eye, whereafter said tying arm is moved to its second position parallel to said track, said gripper device together with the gripped portion of said loop being then moved through said channel of said arm and through said eye to form said knot, and means for tightening said knot.

2. A machine for forming securing loops as claimed in claim 1, in which said bending means consists of a fork mounted on a crank, said fork being swingable into engagement with said tubular part.

3. A machine for forming securing loops as claimed in claim 1, in which said knot tying means comprises a swingable hook adapted to engage said loop formed by bending said tubular part and to tighten said knot.

References Cited in the file of this patent

UNITED STATES PATENTS

| | | |
|---|---|---|
| 1,038,493 | Marcus | Sept. 10, 1912 |
| 1,204,153 | Hardman | Nov. 7, 1916 |
| 1,845,436 | O'Neil | Feb. 16, 1932 |
| 2,009,491 | Goldberger | July 30, 1935 |
| 2,042,227 | Hensel | May 26, 1936 |
| 2,346,786 | Radeck | Apr. 18, 1944 |
| 2,913,270 | Sachsenroder et al. | Nov. 17, 1959 |
| 3,020,599 | Pukis et al. | Feb. 13, 1962 |